United States Patent Office 3,084,192
Patented Apr. 2, 1963

3,084,192
ALPHA-HALO-FORMAMIDINES
Donald L. Smathers, Wilmington, Del., assignor to E. I. du Pont de Nemours and Company, Wilmington, Del., a corporation of Delaware
No Drawing. Filed Apr. 14, 1959, Ser. No. 806,230
3 Claims. (Cl. 260—564)

This invention relates to the discovery that a novel class of alpha-haloformamidines are outstandingly effective herbicides. This invention also relates to herbicidal compositions and methods employing these alpha-haloformamidines.

Certain substituted phenylurea compounds are well known herbicides that have met wide commercial acceptance. However, these substituted phenylureas are generally characterized by low solubility in oil, and thus have required the use of wetting agents, surface active agents, or solid diluents or extending agents in formulations in which these herbicides are applied to the weeds to be killed. For several years, substituted urea herbicides of high solubility in oil have been sought that would enable the preparation and use of highly concentrated solutions of these herbicides in an oil solvent in order to promote ease of formulation and application.

In accordance with this invention, therefore, an oil soluble class of alpha-haloformamidines has been found that upon contact with water hydrolyze into the aforementioned herbicidally active substituted ureas. These haloformamidines are non-polar in nature and form stable solutions with hydrocarbon oils in all proportions. These compounds exhibit superior contact herbicidal action, giving rapid kill of undesirable plants, possibly because in oil solution they penetrate the plants more rapidly than the corresponding substituted urea. The compounds of this invention are readily hydrolyzed by moisture in the soil or after penetration into plant tissue to the corresponding substituted urea, whereupon the herbicidal action is believed to take place.

The alpha-haloformamidines that are precursors of the herbicidal ureas are represented by the following formula:

(1)
$$R_3-N=\overset{X}{\underset{R_2}{C}}-N-R_1$$

where
X is halogen;
$R_1$ is an organic radical, preferably methyl, ethyl, allyl, methoxy or propynyl;
$R_2$ and $R_3$ are different and are aliphatic or aromatic organic radicals, preferably alkyl of 1 through 5 carbon atoms, or an aryl group represented by the structure:

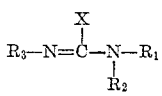

where
A is hydrogen, halogen, alkyl of less than 5 carbons, alkoxy of less than 5 carbons or nitro;
B is hydrogen, halogen or alkyl of less than 5 carbons; and
C is hydrogen or halogen;

with the provisos that one and only one of $R_2$ and $R_3$ is aryl; and that when $R_2$ is aryl, $R_1$ must be methyl or ethyl; and the salts of these alpha-haloformamidines.

The haloformamidines hydrolyze readily into the well known herbicidally active tri-substituted ureas of the following formula:

(2)
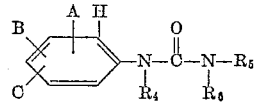

where
$R_4$ is hydrogen or an aliphatic organic radical, preferably methyl or ethyl;
$R_5$ is hydrogen or an organic radical, preferably methyl, ethyl, allyl, methoxy or propynyl;
$R_6$ is an aliphatic organic radical, preferably an alkyl radical of 1 through 5 carbon atoms; and
A, B and C have the same significance as above.
At least one and only one of $R_4$ and $R_5$ will be hydrogen.

A preferred group of haloformamidines are represented by the following formula:

(3)
$$R_3-N=\overset{Cl}{\underset{R_2}{C}}-N-R_1$$

where $R_1$, $R_2$ and $R_3$ are defined as above, and the salts of these alpha-chloroformamidines.

Perhaps the best haloformamidines of the present invention are represented by the formula:

(4)
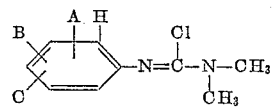

where A, B, and C are defined as above, and the salts of these alpha-chloroformamidines.

Two compounds within the scope of this invention which possess outstanding herbicidal properties are: N,N-dimethyl-N'-(3,4 - dichlorophenyl)-alpha-chloroformamidine N,N-dimethyl - N' - (p-chlorophenyl)-alpha-chloroformamidine.

The novel compounds of this invention can be prepared by reacting the appropriate substituted phenyl-urea with a phosphorus pentahalide in a suitable liquid medium. Equation 5 illustrates this process generally:

(5)
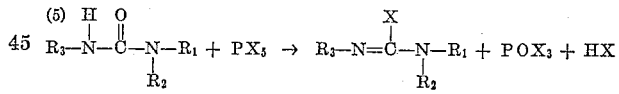

Equation 6 illustrates this process specifically by showing the formation of N,N-dimethyl-N'-(3,4-dichlorophenyl)-alpha-chloroformamidine through the reaction of phosphorus pentachloride with 1,1-dimethyl-3-(3,4-dichlorophenyl)urea.

(6)
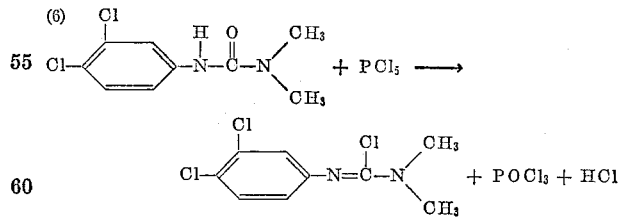

In general, approximately equal molar amounts of substituted phenylurea and phosphorus pentahalide are used. Preferably the amount of phosphorus pentahalide used is somewhat in excess of that of the substituted phenylurea by a ratio of 1.0–1.2 molar equivalents to one molar equivalent of substituted phenylurea. A suitable inert liquid medium is usually present in the ratio of 1–20 parts by weight for every one part by weight of the substituted phenylurea. Preferably 1–5 parts by weight of inert liquid medium are used for one part by weight of substituted phenylurea. A large number of inert substituted or unsubstituted aliphatic or aromatic liquids are suitable for use as media in this reaction. Aromatic hydrocarbons or chlorinated aromatic hydrocarbons are especially suitable, because they dissolve significant amounts of the aryl ureas.

The process of manufacturing the products of this invention involves maintaining the reaction mixture defined above at a suitable temperature with or without agitation until the evolution of the hydrogen halide is essentially complete. The temperature used depends upon the particular urea employed and to some extent on the amount of the urea. The temperature can be maintained between 10° and 140° C. It is convenient and preferable to maintain the temperature between 15° and 30° C. At much higher temperatures undesirable side reactions are noted. After the evolution of hydrogen halide has subsided, the resulting mixture is heated until the evolution of hydrogen halide is substantially complete, and then the resulting solution of substituted alpha-haloformamidine is usually distilled. In this distillation, which is preferably carried out under partial vacuum, the phosphorus oxyhalide formed in the reaction is removed together with a portion or all of the reaction medium. The substituted alpha-haloformamidine which remains behind is substantially pure except for the remaining inert solvent, and is suitable for use in the herbicidal formulations and methods hereinafter described. If desired the substituted alpha-haloformamidine may be further purified by distillation at a considerably lower pressure than that used for removal of solvent.

It is often advantageous to sparge the stirred reaction mixture with an unreactive gas such as dry air of nitrogen to aid in the removal of the hydrogen halide. Complete removal of the hydrogen halide, however, is not critical. Unremoved hydrogen halide present will, of course, form the corresponding salt with the alpha-haloformamidine. Such mixtures of the alpha-haloformamidine and the corresponding hydrogen halide salt can be used in herbicidal applications.

When phosphorus pentafluoride is reacted with substituted phenylureas, it is usually advantageous to carry out the reaction with the arylurea in a closed system and at an elevated temperature. The alpha-fluoroformamidines of this invention can also be prepared by reacting the analogous alpha-chloroformamidine with a conventional fluorinating agent in a closed system at an elevated temperature, as will be readily understood by persons skilled in the art.

Alpha-haloformamidines form acid-addition salts with many acids including hydrogen halides such as hydrogen fluoride, hydrogen chloride, and hydrogen bromide, with such other acids as phosphoric acid and sulfuric acid, and with organosulfonic acids such as benzenesulfonic acid, toluenesulfonic acid, xylenesulfonic acid, alkylnaphthalenesulfonic acids, dodecylbenzenesulfonic acid, naphthalenesulfonic acids, methanesulfonic acid, ethanesulfonic acid, higher alkanesulfonic acids and mixtures of sulfonic acids. For many herbicidal uses these salts are equally satisfactory, particularly the oil soluble salts. Therefore in the present specification and claims, when reference is made to haloformamidines, it is intended to include not only the compound in the free state but also in the form of a salt.

As aforementioned, the compounds of this invention are useful in herbicidal applications. When applied at appropriate dosages, they are effective in controlling broadleaf plants, grasses, woody vines and brush. They can be used as soil sterilants and also as pre-emergence and directed post-emergence herbicides in economic crops. They are especially effective for foliar application, and find outstanding use in the spot treatment of noxious weeds.

In use, the compounds of this invention can be applied to areas to be protected from undesirable vegetation in any of a variety of compositions.

In a preferred composition according to this invention, the compound having the formula shown above is dissolved in an inert substituted or unsubstituted aliphatic or aromatic organic liquid diluent, the compound of this invention being present in sufficient amount to produce a herbicidal effect. The compounds are usually formulated as oil concentrates for ease of handling, the active ingredient being present in from 5% to 98% by weight and preferably 25% to 95%. This concentrated formulation can be used in some instances without dilution, but in most cases it will be more convenient to dilute further with hydrocarbon oils for more uniform coverage. The actual spray concentration will be less than 50% and ordinarily will range from 0.25% to 10% for most applications.

The liquid compositions including the compounds of this invention can be prepared by admixing the compound with the selected inert organic liquid solvent. By inert is meant that the solvent does not have any active hydrogen atoms or other reactive groupings. These oils should be free of water to prevent premature hydrolysis of the alpha-holoformamidine derivative and resultant separation of the corresponding substituted urea herbicide from the formulation. This inert characteristic of the solvent is essential in order that the solvent does not cause any decomposition or other reaction that would interfere with the herbicidal activity of the composition or result in the formation of undesired by-products. Thus, since the solvent must be inert, it cannot act to remove the alpha-halogen atom essential to the compounds of the present invention.

Within the description of the inert organic liquid diluent just given, the particular diluent is not especially critical, and can be selected readily by persons in the art in accordance with such factors as the conditions of storage, the economics of the materials, the climate and in particular the temperature of manufacture, storage and use, safety and ease in handling, the method in which the composition is to be applied to the areas to be protected, the nature of the effect desired, etc.

A large number of aliphatic and aromatic hydrocarbons can be used as solvents for compounds of the present invention. Typical examples are the octanes and higher molecular weight aliphatic hydrocarbons, benzene, toluene, xylene, ethylbenzene, diethylbenzene, cumene, cymene, butylbenzenes, alkylated naphthalenes and higher molecular weight aromatic hydrocarbons. Particularly suitable are mixtures of such hydrocarbons. Typical of the hydrocarbon mixtures that can be used are diesel oils, fuel oils, kerosenes, paraffin and isoparaffin oils, Stoddard solvent and the like, and the commercial herbicidal oils such as "Lion Herbicidal Oil No. 6" and "Conoco Weed Oil." Preferably the hydrocarbons used have a boiling point from 100° to 400° C., since lower boiling hydrocarbons present a serious fire hazard.

Chlorinated aliphatic and aromatic hydrocarbons are also suitable and may in some cases be especially advantageous because of the reduced fire hazard. Typical examples are tetrachloroethylene, trichloroethylene, ethylene dichloride, dichloropropane, dichlorobutane, dichloropentane, vinyl chloride, vinylidene chloride, trichloroethane, tetrachloroethane, methylene chloride, chloroform, carbon tetrachloride, chlorobenzene, dichlorobenzene and chlorotoluene. The commercially available chlorofluorocarbons can be used in certain specific formulations notably in propellant compositions. Examples of such chlorofluorocarbons are chlorodifluoromethane, dichlorodifluoromethane, fluorotrichloromethane, and tetrafluorodichloroethane.

There are numerous other inert organic diluents suitable for use in this invention. Among them are such compounds as nitrobenzene, bromobenzene and dibromobenzene.

Preferred diluents are xylene, chlorobenzene, alkylated naphthalenes, diesel oils, fuel oils, kerosenes, paraffin oils and the commercial herbicidal oils including those aforementioned. It will be obvious to persons in the art that other diluents can be used. Because of such factors as cost, toxicity, combustibility, or other undesirable property, some diluents are less preferred than others.

It is also possible to mix a relatively concentrated oil solution of the alpha-haloformamidines of this invention with water just prior to ejection from the spray nozzle in certain applications.

Compositions according to this invention can also include various other ingredients such as corrosion inhibitors, dehydrating agents, and the like, as will be readily understood. Such additives will of course be compatible with the other ingredients in the composition, usually soluble in the particular solvent used, and similarly nonreactive with the alpha-haloformamidine compound. Suitable corrosion inhibitors include anhydrous quaternary ammonium salts, such as cetyltrimethylammonium chloride, triesters of phosphoric acid, such as tricresyl phosphate, and certain tertiary amines such as triphenylamine.

Particularly useful dehydrating agents include anhydrous magnesium sulfate, anhydrous calcium sulfate and silica gel. Some of these drying agents do not, of course, dissolve in the solutions of our invention.

It is often advantageous to add 1–10% of a high molecular weight, higher aliphatic tertiary amine to combine with hydrogen halide which may be present in the composition. Especially suitable tertiary amines include triheptylamine, triisooctylamine, tridecylamine and trilaurylamine.

The compounds and compositions of this invention can also be used in conjunction with other known herbicides. Where compatible and non-reactive as described above, one or more of these other herbicides can be admixed with the alpha-haloformamidines of this invention or, if necessary or desirable, formulated separately and then applied concurrently or consecutively to the same areas. For some uses it is advantageous to use a herbicidal urea in conjunction with the compounds and compositions of the present invention, such as, 1,1-dimethyl-3-(3,4-dichlorophenyl)urea
1,1-dimethyl-3-(p-chlorophenyl)urea
1,1-dimethyl-3-phenylurea
1-n-butyl-1-methyl-3-(3,4-dichlorophenyl)urea
1-methoxy-1-methyl-3-(3,4-dichlorophenyl)urea
1-methoxy-1-methyl-3-(p-chlorophenyl)urea
1,1,3-trimethyl-3-(3,4-dichlorophenyl)urea Other known herbicides that can advantageously be used in conjunction with the compounds and compositions of the present invention include:

2-chloro-4,6-bis(ethylamino)-s-triazine
2-chloro-4,6-bis(methoxypropylamino)-s-triazine
2,4-bis(isopropylamino)-6-methoxy-s-triazine
aminotriazole
2,3,6-trichlorobenzoic acid and salts thereof
2,3,5,6-tetrachlorobenzoic acid and salts thereof
2-chloro-N,N-diallylacetamide
N,N-dipropylthiolcarbamic acid, ethyl ester
2,2,-dichloropropionic acid and salts thereof
Methylarsonic acid and salts thereof
Borates
Chlorates
Ammonium sulfamate
2,4-dichlorophenoxyacetic acid
2,4,5-trichlorophenoxyacetic acid
N-phenylcarbamic acid, isopropyl ester
N-(p-chlorophenyl)carbamic acid, isopropyl ester
Trichloroacetic acid
Maleic hydrazide
Dinitro-sec-butylphenol
2,3,6-trichlorophenylacetic acid
5,6-dihydro-(4A,6A)-dipyrido-(1,2-A,2',1'-C)-pyrazinium dibromide and the commercial herbicidal oils including those aforementioned.

According to one embodiment of this invention, the particular hydrocarbon liquid diluent used can be of the "Freon" propellent type to provide an aerosol self-contained spray composition useful in garden-type applications. Such formulations contain one or more "Freon" propellents and often other liquid diluents.

The herbicidal method of use of the alpha-haloformamidines comprises applying one or more of such compounds, ordinarily in a herbicidal composition of the type described above, to the locus or area to be protected from undesirable plant growth. The alpha-haloformamidine is, of course, applied in sufficient amount to effect the desired herbicidal action. The application can be made directly upon the locus or area and the vegetation thereon during the period of infestation. Alternatively, the application can be made in advance of an anticipated weed infestation.

The dosage employed can be determined readily by those skilled in the art by conventional techniques. It is, of course, dependent upon the particular active ingredient employed, the nature of the formulation used, the type of treatment, the type of vegetation to be controlled, climatic conditions and the like. In general, complete control of vegetation is obtained at rates of from 10–50 pounds per ace of the substituted alpha-haloformamidine compound. Application at rates of about 0.25 to 4 pounds per acre of the formamidine compound for pre-emergence or early directed post-emergence treatment gives excellent control of annual broadleaf and grass weeds in crop plants, such as cotton, sugar cane, pineapple and asparagus.

In order that the invention can be better understood, the following examples are given in addition to those set forth above:

EXAMPLE 1

*N,N-Dimethyl-N'-Phenyl-Alpha-Chloroformamidine*

A mixture of 164 parts by weight of 1,1-dimethyl-3-phenylurea, 1500 parts of chlorobenzene and 208 parts of phosphorus pentachloride is heated to reflux temperature. Heating is continued, at reflux, until hydrogen chloride evolution is essentially complete. The resulting reaction solution is distilled to remove solvent and volatile by-products, leaving in the pot N,N-dimethyl-N'-phenyl-alpha-chloroformamidine. If desired, a purer product is obtained by distillation, B.P. 96°–99° C./1 mm.

EXAMPLE 2

*N,N-Dimethyl-N'-(p-Chlorophenyl)-Alpha-Chloroformamidine*

A mixture of 198 parts by weight of 1,1-dimethyl-3-p-chlorophenylurea, 1000 parts of chlorobenzene and 208 parts of phosphorus pentachloride is heated to reflux. Heating is continued, at reflux, until hydrogen chloride evolution is essentially complete. The resulting reaction solution is distilled to remove solvent and volatile by-products, leaving in the pot N,N-dimethyl-N'-(p-chlorophenyl)-alpha-chloroformamidine. If desired, a purer product is obtained by distillation B.P. 117°–120° C./1 mm.

EXAMPLE 3

*N,N-Dimethyl-N'-(3,4-Dichlorophenyl)-Alpha-Chloroformamidine*

A mixture of 233 parts by weight of 1,1-dimethyl-3-(3,4-dichlorophenyl)urea, 1400 parts of chlorobenzene and 208 parts of phosphorus pentachloride is heated to reflux. Heating is continued, at reflux, until hydrogen chloride evolution is essentially complete. The resulting reaction solution is distilled to remove solvent and volatile byproducts, leaving in the pot N,N-dimethyl-N'-(3,4-dichlorophenyl)-alpha-chloroformamidine. If desired, a purer product is obtained by distillation, B.P. 129° to 131° C./1 mm.

EXAMPLE 4

N,N-Dimethyl-N'-(3,4-Dichlorophenyl)-Alpha-Chloroformamidine

A mixture of 233 parts by weight of 1,1-dimethyl-3-(3,4-dichlorophenyl)urea, 1500 parts of xylene, and 208 parts of phosphorus pentachloride is heated to reflux. Heating is continued, at reflux, until hydrogen chloride evolution is essentially complete. The resulting reaction solution is distilled to remove volatile by-products and excess solvent, leaving in the pot essentially pure N,N-dimethyl - N' - (3,4 - dichlorophenyl) - alpha - chloroformamidine.

EXAMPLE 5

N,N-Dimethyl-N'-(3,4-Dichlorophenyl)-Alpha-Chloroformamidine

To a stirred slurry of 370 parts by weight of phosphorus pentachloride in 460 parts of chlorobenzene is gradually added a slurry of 400 parts of 1,1-dimethyl-3-(3,4-dichlorophenyl)urea in 304 parts of chlorobenzene. When addition is complete the resulting mixture is stirred for 15 minutes at autogenous temperature and then heated to reflux. Refluxing is continued until hydrogen chloride evolution is essentially complete. The resulting solution is distilled at reduced pressure to remove volatile impurities, including by-product phosphorus oxychloride and chlorobenzene solvent. The residue in the pot is essentially pure N,N-dimethyl-N'-(3,4-dichlorophenyl)-alpha-chloroformamidine, suitable for use in herbicidal compositions of this invention.

EXAMPLE 6

N,N-Dimethyl-N'-(3,4-Dichlorophenyl)-Alpha-Bromoformamidine

To a stirred mixture of 440 parts by weight of phosphorus pentabromide in 900 parts of chlorobenzene is gradually added a slurry of 233 parts of 1,1-dimethyl-3-(3,4-dichlorophenyl)urea in 180 parts of chlorobenzene. When the addition is complete, the resulting mixture is stirred for thirty minutes at autogenous temperature and then heated to reflux until hydrogen bromide evolution is essentially complete. The resulting solution is distilled at reduced pressure to remove volatile impurities, including by-product phosphorus oxybromide and chlorobenzene. The residue in the pot is essentially pure N,N-dimethyl - N' - (3,4 - dichlorophenyl) - alpha - bromoformamidine, suitable for use in the herbicidal compositions of this invention.

Alpha-haloformamidines which can be prepared following the general reactions of the preceding examples include:

N,N-dimethyl-N'-(p-methoxyphenyl)-alpha-chloroformamidine

N,N-dimethyl-N'-(p-ethoxyphenyl)-alpha-chloroformamidine

N,N-dimethyl-N'-(m-fluorophenyl)-alpha-chloroformamidine

N,N-dimethyl-N'-(2,4-difluorophenyl)-alpha-bromoformamidine

N,N-dimethyl-N'-(2,4-dimethylphenyl)-alpha-bromoformamidine

N,N-dimethyl-N'-(p-bromophenyl)-alpha-chloroformamidine

N,N-dimethyl-N'-(4-chloro-5-nitro-2-methylphenyl)-alpha-chloroformamidine

N-isopropyl-N-(2-propynyl)-N'-(3,4-dichlorophenyl)-alpha-chloroformamidine

EXAMPLES 7–23

Following the procedure of Example 1, the following substituted phenylureas (parts by weight given in parentheses) are reacted with 208 parts of phosphorus pentachloride using 1500 parts of chlorobenzene to form the corresponding substituted alpha-chloroformamidines. The resulting haloformamidines will hydrolyze on contact with water back to the phenylureas.

| Example No. | Substituted Phenylurea | Substituted Alpha-Chloroformamidine |
| --- | --- | --- |
| 7 | 1,1-diethyl-3-(3,4-dichlorophenyl)urea (261). | N,N-diethyl-N'-(3,4-dichlorophenyl)-alpaha chloroformamidine. |
| 8 | 1-n-butyl-1-methyl-3-(3,4-dichlorophenyl)urea (275). | N-n-butyl-N-methyl-N'-(3,4-dichlorophenyl) - alpha - chloroformamidine. |
| 9 | 1-methyl-1-isopropyl-3-(3,4-dichlorophenyl)urea (261). | N-methyl-N-iso-propyl-N'-(3,4-dichlorophenyl)-alpha-chloroformamidine. |
| 10 | 1-sec-butyl-1-methyl-3-(3,4-dichlorophenyl)urea (275). | N-sec-butyl-N-methyl-N'-(3,4-dichlorophenyl)-alpha-chloroformamidine. |
| 11 | 1,1-dimethyl-3-(3,4-dichlorophenyl)urea (198). | N,N-dimethyl-N'-(3,4-dichlorophenyl) - alpha-chloroformamidine. |
| 12 | 1,1-dimethyl-3-(3-chloro-4-methylphenyl)urea (212). | N,N-dimethyl-N'-3-(chloro-4-methylphenyl) - alpha-chloroformamidine. |
| 13 | 1,1-dimethyl-3-(2,4,5-trichlorophenyl)urea (268). | N,N-dimethyl-N'-(2,4,5-trichlorophenyl)-alpha-chloroformamidine. |
| 14 | 1,1-dimethyl-3-(4-chloro-3-nitrophenyl)urea (243). | N,N,-dimethyl-N'-(4-chloro-3-nitrophenyl)-alpha-chloroformamidine. |
| 15 | 1,1-dimethyl-3-(4-methylphenyl)urea (178). | N,N-dimethyl-N'-(4-methylphenyl)-alpha-chloroformamidine. |
| 16 | 1-methyl-1-n-propyl-3-phenylurea (192). | N-methyl-N-n-propyl-N'-phenyl-alpha-chloroformamidine. |
| 17 | 1 - methyl - 1 -isopropyl - 3-phenylurea (192). | N-methyl-N-iso-propyl-N'-phenyl-alpha-chloroformamidine. |
| 18 | 1-n-butyl-1-methyl-3-phenylurea (206). | N-n-butyl-N-methyl-N'-phenyl-alpha-chloroformamidine. |
| 19 | 1-methoxy-1-methyl-3-(4-chlorophenyl)urea (214). | N-methoxy-N-methyl-N'-(4-chlorophenyl)-alpha-chloroformamidine. |
| 20 | 1-methoxy-1-methyl-3-(3,4-dichlorophenyl)urea (249). | N-methoxy-N-methyl-N'-(3,4-dichlorophenyl)-alpha-chloroformamidine. |
| 21 | 1,1-dimethyl-3-(3-chloro-4-iso-propylphenyl) urea (241). | N,N-dimethyl-N'-(3-chloro-4-iso-propylphenyl)-alpha-chloroformamidine. |
| 22 | 1,3-dimethyl-3-(3,4-dichlorophenyl)urea (233). | N,N'-dimethyl-N'-(3,4-dichlorophenyl)-alpha-chloroformamidine. |
| 23 | 1,3-dimethyl-3-phenylurea (164). | N,N'-dimethyl-N'-phenyl-alpha-chloroformamidine. |

EXAMPLES 24–27

Following the procedure of Example 6, the following substituted phenylureas (parts by weight given in parentheses) are reacted with 440 parts of phosphorus pentabromide using 1080 parts of chlorobenzene to form the corresponding substituted alpha-bromoformamidines:

| Example No. | Substituted Phenylurea | Substituted Alpha-Bromoformamidine |
| --- | --- | --- |
| 24 | 1,1 - dimethyl - 3 - (p-chlorophenyl)urea (198). | N,N-dimethyl-N'-(p-chlorophenyl)-alpha-bromoformamidine. |
| 25 | 1-n-butyl-1-methyl-3-(3,4-dichlorophenyl)urea (275). | N-n-butyl-N-methyl-N'-(3,4-dichlorophenyl)-alpha-bromoformamidine. |
| 26 | 1,1-dimethylurea-3-phenylurea (164). | N,N-dimethyl-N'-phenyl-alpha-bromoformamidine. |
| 27 | 1,3-dimethyl-3-(3,4-dichlorophenyl)urea (233). | N,N'-dimethyl-N'-(3,4-dichlorophenyl) - alpha - bromoformamidine. |

In the following examples, the percent figures are percent by weight.

EXAMPLE 28

| | Percent |
| --- | --- |
| N,N - dimethyl - N' - (3,4 - dichlorophenyl) - alpha-chloroformamidine | 90 |
| Monochlorobenzene | 10 |

This liquid composition is exended with diesel oil (1 lb. of the composition in 20 gallons of oil) and applied at the rate of 0.9 lb. per acre of the active material to a field of newly planted cotton. This pre-emergence application gives excellent control of annual broadleaf and grass weeds (pigweed, lamb's-quarters, crab grass, and yellow foxtail) with normal growth of the cotton plants.

EXAMPLE 29

| | Percent |
|---|---|
| N,N - dimethyl - N' - (p - chlorophenyl) - alpha-chloroformamidine | 95 |
| Xylene | 5 |

This liquid composition is diluted with a commercial herbicidal oil "Lion Herbicidal Oil No. 6." The resulting solution is applied at the rate of 10 pounds of active ingredient in 100 gallons of oil per acre to a railroad right-of-way infected with both broadleaf and grass weeds. Excellent control of crabgrass, foxtail, seedling Johnson grass, lamb's-quarters, butter and eggs, cocklebur, ragweed, and goldenrod is obtained.

EXAMPLE 30

| | Percent |
|---|---|
| N,N - dimethyl - N' - phenyl - alpha - chloroformamidine | 25.0 |
| Monochlorobenzene | 1.3 |
| Kerosene | 73.7 |

This solution is prepared by stripping the chlorobenzene solvent used in the manufacture of the alpha-chloroformamidine until only about 5% remains and then adding kerosene. This composition is applied to noxious perennial weeds at the rate of 40 lbs. per acre of the active ingredient in 50 gallons of kerosene. This treatment gives good control of quack grass, Johnson grass, field bindweed, and leafy spurge.

EXAMPLE 31

| | Percent |
|---|---|
| N - (n - butyl) - N - methyl - N' - (3,4 - dichlorophenyl)-alpha-chloroformamidine | 25 |
| Xylene | 75 |

The solution is applied directly and without further dilution as a directed post-emergence spray at the rate of 4 lbs. per acre (active) for the control of barnyard grass, crabgrass, chickweed, ragweed and crabgrass growing in a nursery that contains arbor vitae, privet, Norway spruce, and Euonymous. Excellent weed control is obtained without injury to the ornamental plantings.

EXAMPLE 32

| | Percent |
|---|---|
| N - (n - butyl) - N - methyl - N' - (3,4 - dichlorophenyl)-alpha-chloroformamidine | 20 |
| Tetrachloroethylene | 80 |

The above composition is applied directly and without further dilution to an ornamental planting of yew, pine, and Norway spruce infected with a sporadic infestation of crabgrass and chickweed. A 4 lbs. per acre rate of active ingredient applied as a "spot" spray to the weeds gives excellent weed control and no injury to the ornamental shrubs.

EXAMPLE 33

| | Percent |
|---|---|
| N,N - dimethyl - N' - (3,4 - dichlorophenyl) - alpha-chloroformamidine | 90 |
| Cetyltrimethylammonium chloride (corrosion inhibitor) | 2 |
| Monochlorobenzene | 8 |

This composition is prepared by dissolving cetyltrimethylammonium chloride in the concentrate obtained by stripping most of the monochlorobenzene from the reaction mixture.

It is applied pre-emergence at the rate of 1.6 lbs. per acre (active) in 25 gallons of diesel oil for the control of annual grass and broadleaf weeds in asparagus. The treatment is applied prior to the emergence of the asparagus spears.

EXAMPLE 34

| | Percent |
|---|---|
| N,N - dimethyl - N' - (p - chlorophenyl) - alpha-chloroformamidine | 85 |
| Tricresyl phosphate (corrosion inhibitor) | 3 |
| Xylene | 12 |

This composition is added to "Lion Herbicidal Oil No. 6" and sprayed at the rate of 12 pounds per acre (active) in 100 gallons of herbicidal oil. This treatment gives excellent control of crabgrass, volunteer wheat seedlings, mare's-tail, buttonweed, and chickweed growing in a railroad yard.

EXAMPLE 35

| | Percent |
|---|---|
| N,N - dimethyl - N' - (3,4 - dichlorophenyl) - alpha-chloroformamidine | 50 |
| Oil-soluble petroleum sulfonate | 5 |
| Xylene | 45 |

This concentrated liquid composition is injected into water or an oil-water emulsion at a spray nozzle for application to railroad rights-of-way. It is applied at the rate of 15 pounds per acre (active) for the control of annual and perennial broadleaf and grass weeds.

EXAMPLE 36

| | Percent |
|---|---|
| N- (n - butyl) - N - methyl - N' - (3,4 - dichlorophenyl)-alpha-chloroformamidine | 25 |
| "Freon" propellent | 25 |
| "Freon 12" propellent | 25 |
| Methylene chloride | 15 |
| Xylene | 10 |

This composition is pressure-packed under rigidly anhydrous conditions into an aerosol bomb. It is applied as a "spot spray" application at 2 lbs. per acre (active) for the control of chickweed in bluegrass turf.

EXAMPLE 37

| | Percent |
|---|---|
| N,N - dimethyl - N' - (3,4 - dichlorophenyl) - alpha-chloroformamidine | 93 |
| N,N - dimethyl - N' - (3,4 - dichlorophenyl) - alpha-chloroformamidine, HCl salt | 3 |
| Monochlorobenzene | 4 |

This liquid composition is diluted with a commercial herbicidal oil, "Conoco Weed Oil." The resulting solution is applied at the rate of 10 pounds of active ingredient in 100 gallons of oil per acre to a roadside infected with a mixed weed population. Excellent control of cocklebur, ragweed, crabgrass, seedling Johnson grass and other broadleaf and grass weed species is obtained.

EXAMPLE 38

| | Percent |
|---|---|
| N,N - dimethyl-N'-(3,4-dichlorophenyl)-alpha-bromoformamidine | 40 |
| Xylene | 60 |

This solution is diluted with kerosene at the site of application and applied at the rate of 15 lbs./acre of active ingredient in 100 gallons of total solvent to a mixed weed population in an area surrounding a warehouse. Excellent control of crabgrass, brome grass, giant ragweed, pigweed, lamb's-quarters and other annular and perennial weeds is obtained.

EXAMPLE 39

| | Percent |
|---|---|
| N,N-dimethyl-N'-(p - chlorophenyl) - alpha - bromoformamidine | 92 |
| Monochlorobenzene | 8 |

This liquid concentrate is obtained by distilling off most of the chlorobenzene solvent used in the manufacture of the alpha-bromoformamidine. It is extended with a commercial herbicidal oil, "Conoco Weed Oil," 10 lbs. of the composition in 100 gallons of oil, and applied at the rate of 10 lbs. per acre of active ingredient to vegetation growing around an electric utility substation. Grass and broadleaf weeds are killed and the area remains free of plant growth for an extended period.

EXAMPLE 40

| | Percent |
|---|---|
| N,N - dimethyl-N'-(3,4-dichlorophenyl)-alpha,-fluoroformamidine | 95 |
| Xylene | 5 |

This liquid composition is diluted with a commercial herbicidal oil, "Lion Herbicidal Oil No. 6." The resulting solution is applied at the rate of 30 lbs. of active ingredient per acre in 150 gallons of oil and applied to vegetation growing in and around a lumber storage yard. The foliage of quack grass, Johnson grass, water grass, ragweed, cocklebur, goldenrod and other weeds in the area are destroyed and no regrowth of plants is evident throughout the growing season.

EXAMPLE 41

| | Percent |
|---|---|
| N,N - dimethyl-N'-(3,4-dichlorophenyl)-alpha-chloroformamidine | 79 |
| Triisooctylamine | 5 |
| Monochlorobenzene | 16 |

This liquid composition is extended with diesel oil (4 pounds of the composition in 20 gallons of diesel oil) and applied at the rate of 4 pounds per acre of active ingredient to a field of pineapple. This treatment is applied as a directed post-emergence spray to the emergent seedling weeds. The spray is directed so that a minimum amount of spray contacts the pineapple. This treatment gives excellent control of the existing weed population and extended residual weed control on annuals without injury to pineapple.

This application is a continuation-in-part of my application Serial No. 798,613, filed March 11, 1959, which in turn is a continuation-in-part of my application Serial No. 781,477, filed December 19, 1958 (both now abandoned).

The invention claimed is:
1. A compound selected from the group consisting of (1) alpha-haloformamidines of the formula:

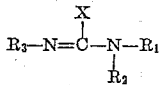

wherein X is selected from the group consisting of chlorine, bromine and fluorine $R_1$ is selected from the group consisting of methyl, ethyl, allyl, methoxy and propynyl; and one of the group $R_2$ and $R_3$ is alkyl of less than 6 carbon atoms, and the other has the structure

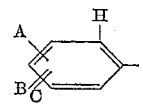

wherein A is selected from the group consisting of hydrogen, chlorine, bromine, fluorine, alkyl of less than 5 carbon atoms, alkoxy of less than 5 carbons and nitro; B is selected from the group consisting of hydrogen, chlorine, bromine, fluorine and alkyl of less than 5 carbon atoms; and C is selected from the group consisting of hydrogen, chlorine, bromine and fluorine; provided that when $R_2$ has said structure, $R_1$ is selected from the group consisting of methyl and ethyl; and (2) the acid-addition salts of said alpha-haloformamidines.

2. N,N - dimethyl-N'-(3,4-dichlorophenyl)-alpha-chloroformamidine.

3. N,N-dimethyl-N'-(p-chlorophenyl) - alpha - chloroformamidine.

References Cited in the file of this patent

UNITED STATES PATENTS

| 2,252,722 | Miescher et al. | Aug. 19, 1941 |
| 2,252,723 | Miescher et al. | Aug. 19, 1941 |
| 2,726,150 | Wolter | Dec. 6, 1955 |
| 2,845,458 | Lecher et al. | July 29, 1958 |
| 2,849,306 | Searle | Aug. 26, 1958 |

FOREIGN PATENTS

| 498,090 | Great Britain | Jan. 3, 1939 |
| 235,444 | Switzerland | Apr. 16, 1945 |

OTHER REFERENCES

Hill et al.: J.A.C.S., volume 48, pages 732–737 (1926), 260–564.

Hill et al.: J. Am. Chem. Soc., vol. 76, pp. 3978–82 (1954).